Oct. 16, 1934.  E. H. ALLEN  1,976,979
AUTOMATIC TRAILER SUPPORT
Filed Sept. 6, 1933  2 Sheets-Sheet 1
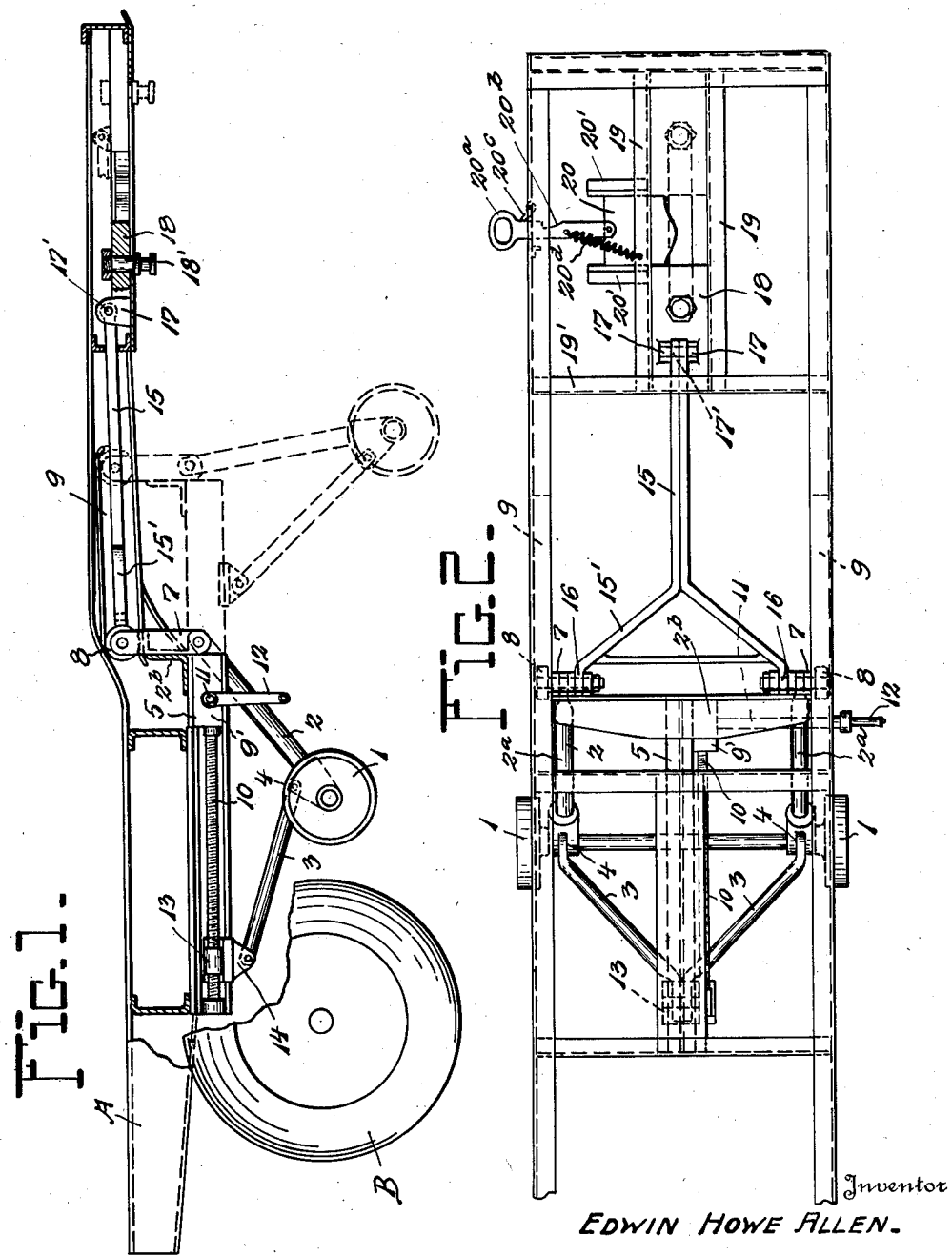
Inventor
EDWIN HOWE ALLEN.
By Robert Cobb
Attorneys Oct. 16, 1934.  E. H. ALLEN  1,976,979
AUTOMATIC TRAILER SUPPORT
Filed Sept. 6, 1933  2 Sheets-Sheet 2
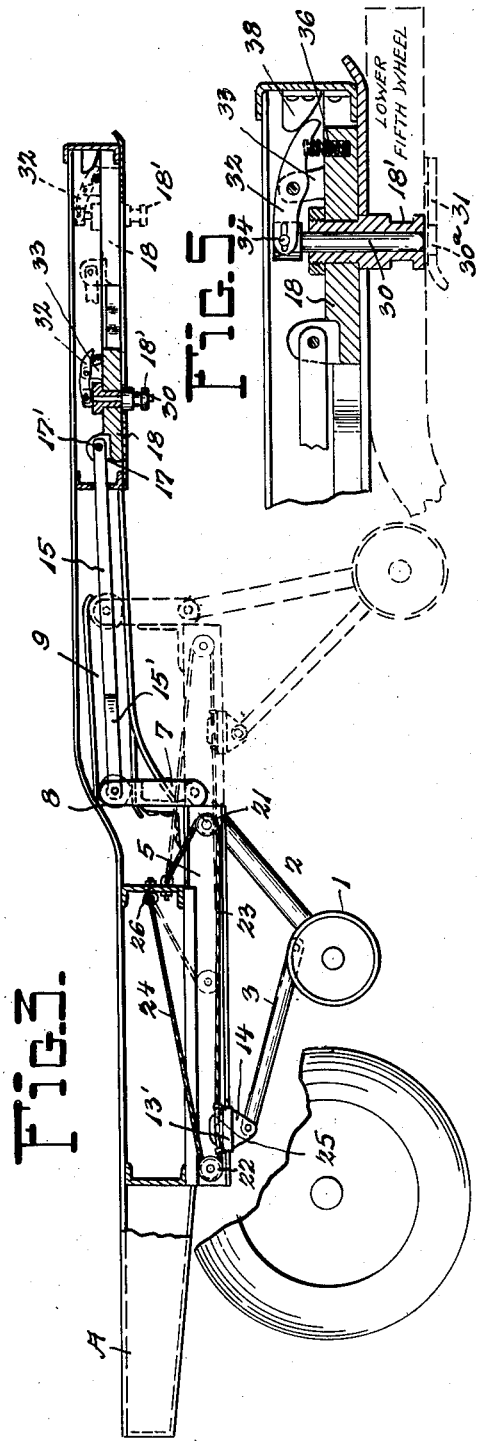
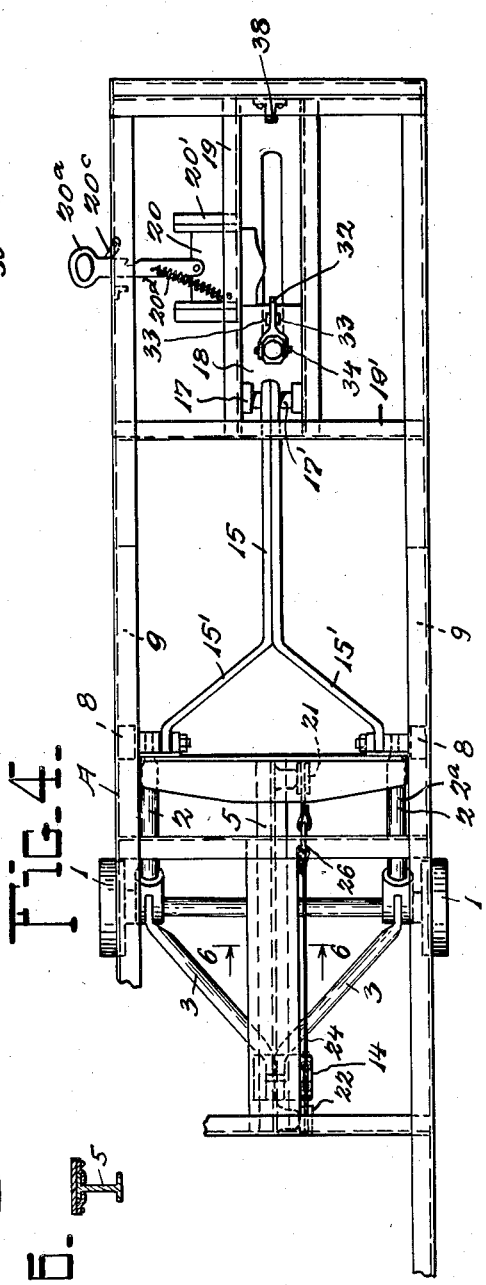
Inventor
EDWIN HOWE ALLEN.
By Robb & Robb
Attorneys Patented Oct. 16, 1934

1,976,979

UNITED STATES PATENT OFFICE 1,976,979

AUTOMATIC TRAILER SUPPORT

Edwin Howe Allen, Edgerton, Wis., assignor to Highway Trailer Company, Edgerton, Wis., a corporation Application September 6, 1933, Serial No. 688,409

10 Claims. (Cl. 280—33.1)

This invention relates to trailer vehicles of the type employed in highway transportation systems and commonly used in tractor-trailer vehicle combinations. Trailers of this class include a main frame plus a pair of road wheels at the rear end of the frame, the forward end being supported during transportation on the tractor, coupled thereto through conventional fifth wheel devices. For supporting the forward end of the trailer when disconnected from the tractor, as for loading or unloading, a wheeled carriage is commonly used that is adjustable manually or automatically, according to the carriage design and hook-up with the other parts of the trailer, to support the forward end of the vehicle or to a position of non-interference with the tractor when the trailer is coupled thereto.

The principal object of this invention is to provide, in combination with a trailer of the class having a shiftable wheel support for the front end of the trailer, provided with means for raising and lowering the wheels, a system for shifting the support relative to the trailer incident to the coupling or uncoupling operations of tractor to trailer, independently in one embodiment, of any co-ordinated lowering or raising of the supporting wheels. In another embodiment of the invention, however, the wheels are raised and lowered, as the case may be, incident to movement of the wheel support which in turn is movable incident to movement of the tractor to coupling or uncoupling position.

The forward movement of the support when it is lowered to its operating position with the wheels thereof on the road surface, is desirable in order to carry the support as near the forward end of the trailer as possible to prevent tilting through over balancing of the load while stationary and taking on or discharging pay-load.

In realizing my invention, I preferably connect the wheel support to the trailer king pin through a draw bar, and, as the king pin is engaged by the female tractor coupling device, the wheel support is moved bodily and rearwardly to clear the zone it occupies while supporting the trailer. In an embodiment, the wheels may be lifted to clear the road normally through crank and screw mechanism, however, in another embodiment movement of the support rearwardly acts through a flexible cable arrangement to automatically lift the wheels clear of the ground. In addition to the foregoing, I provide means for locking the king pin against movement relative to the trailer to thereby hold the wheel support in the desired position. Movement of the tractor to uncoupling position shifts the wheel support to the forward end of the trailer to the zone it occupies when the trailer is disconnected and lowering of the wheels is accomplished in one embodiment manually, and in another, automatically, so I might well, therefore, term these embodiments, to distinguish one from the other, as semi-automatic and automatic.

Another feature of this invention, which may be applied to either automatic or semi-automatic type is the provision of means for finally releasing the fifth wheel coupling instrumentalities without manual intervention, incident to movement of the king pin assembly into a predetermined position. Therefore, in one embodiment, I obtain a shifting of the wheel support and automatic releasing of the king pin plus manual raising and lowering of the wheels, whereas, in the other embodiment, I obtain, in addition to the first two features, an automatic raising and/or lowering of the wheels.

Other objects and advantageous features will be observed in the following detailed description and accompanying drawings, wherein like characters of reference designate like parts.

In the drawings:—

Figure 1 is a side elevation, partly in section, of a trailer embodying my invention, and wherein the wheel support is raised and/or lowered manually.

Figure 2 is a top plan view of the trailer of Figure 1, disclosing the lock mechanism.

Figure 3 is a side elevation partly in section of a trailer embodying another form of my invention, wherein the wheels are raised and lowered incident to movement of the push and pull frame.

Figure 4 is a top plan view of the trailer of Figure 3.

Figure 5 discloses the mechanism for automatic release of the coupling instrumentalities.

Figure 6 is a section taken on the line 6—6 of Figure 4.

With reference to the drawings, I have shown in Figures 1 and 2, one embodiment of my invention, as employed in connection with a trailer, wherein the reference character A designates the chassis or frame, and B the rear wheels that are supported through the usual axle and spring construction, not shown in detail.

The trailer support for up-holding the forward end of the trailer during loading or unloading, and when uncoupled, from a tractor, is at least in part a conventional design and includes supporting wheels 1, a hangar frame 2, and the push and pull frame 3, the frame 2 being rigid with the axle supporting means for the wheels 1 and the frame or bar member pivoted thereto at 4. Slidable on the underside of the trailer A, is a carrier member in the form of an I-beam 5.

This carrier member 5 supports at its forward end the hangar frame 2, which is made up of spaced bars 2a and a cross plate 2b, rigidly interconnected with the carrier member 5. The cross plate 2b is in fact an angle plate, L-shaped in cross section, wherein the horizontal leg is pivoted or secured to the carrier member 5. Secured to the vertical leg of the cross plate 2b are a pair of spaced roller supports 7 which carry on their upper ends roller members 8, working in guideways 9 formed as a part of the sill members of the frame or chassis A of the trailer. The connection between the side members 2a of the frame 2 and the cross plate 2b may be established with the lower end of the support member 7.

The carrier slide 5 mounts a gear housing 9', Figure 1, which receives one end of a screw shaft 10, the box having gears, not shown, for rotating the screw shaft 10 for raising and lowering movements of the wheels 1. The screw shaft is rotated through the medium of a cross shaft 11, and crank 12, whereupon movement is afforded to a slide member 13 encompassing the screw and carrying a hangar bracket 14 pivotally connected to the push and pull frame 3.

It is believed that the operation of raising and lowering the wheels 1 with respect to the road level will be clearly apparent inasmuch as turning of the crank 12 feeds the slider 13 toward or away from the front end of the trailer dependent upon the direction of rotation. As the slider moves forward, the wheels 1 are moved into engagement with a supporting surface and when the slider is moved in the opposite direction, the wheels are retracted or lifted to clear the road.

As before mentioned, the hangar frame is shiftable along the trailer to various positions, for as shown in Figure 1, in full line position to dotted line position, I preferably accomplish this automatically rather than manually, through the medium of a draw bar 15 having a yoke 15' pivotally connected at 16 to the hangar frame which, at its other end, is pivotally connected to spaced brackets 17 through the medium of a small cross shaft 17', the brackets being in turn formed as a part of a slider 18 carrying the king pin 18'.

The carrier 18 is mounted for sliding movements in spaced angle members 19 that form a supporting guideway therebetween that extends from a cross member 19' to the forward end of the trailer, the slider working in the zone between the cross member 19' and the forward end of the trailer, as shown in Figure 1.

Hence, assuming that the wheels 1 are in the position shown in full line, in Figure 1, with the slider 13 backed to permit the wheels to clear the ground, the tractor, which would be coupled to the trailer through the medium of a female fifth wheel part engaging and locking the king pin 18, would shift the carrier member forward upon forward movement of the tractor to the dotted line position, however, with the wheels 1 in retracted position. This shifting can take place only when a lock, which I will hereinafter describe, has been released. Accordingly, with the wheels shifted to the zone which they occupy for supporting the trailer, the operator can easily move them to the dotted line position shown by rotating the crank 12.

As for the lock member, I have shown that best in Figure 2, wherein it comprises a slider 20, working between guideways 20' and having a handle 20a attached thereto, provided with a notch 20b for engagement with a detent 20c, pivotally attached to the frame. The whole assembly is mounted in a position normal to the direction of movement of the king pin slider 18 and is urged in an inward direction by the spring member 20d.

With the king pin in the dotted line position shown in Figure 1, the tractor may be coupled thereto, and the slider 20 pulled rearwardly by means of the handle 20a, until the detent 20c engages the notch 20b which will clear the guideway 19 so that the slide 18 may move rearwardly therein. Accordingly, as the tractor moves rearwardly, the slider and the carrier construction for the wheels 1 is shifted rearwardly, it being understood that the wheels 1 are first lifted by the operator through the crank 12. While the slider has been moved to the position shown in full line in Figure 2, the detent 20c may be released which will allow the slider 20 to move forward in front of the slider 18 and thereby prevent any forward movement thereof.

Referring now to Figures 3 and 4, I show a means for raising and lowering the supporting wheels that is automatically actuated as distinguished from the manual means of Figures 1 and 2. The whole carrier frame is shiftable as outlined in the description of Figures 1 and 2, through the medium of the slide block 18, carrying the king pin 18', and connected to the wheel carrier through the draw bar 15.

However, for raising and lowering the wheels 1, I provide instrumentalities which include a front grooved roller 21 and a rear grooved roller 22, about which pass cable elements 23 and 24 respectively. The cable element 23 is attached at 25 to a slide 13' which carries depending bracket members 14, pivotally connected with the push and pull frame 3. The cable element 24 is likewise attached to the slide 13' after passing around the pulley or roller 22, and at its opposite end, is attached to an eye mounted on a stationary cross piece 26 of the frame A. The end of the cable element 23 is likewise attached to an eye mounted on the stationary frame 26. According to the above construction, when the carrier 5 is moved forwardly and rearwardly in the manner set forth with respect to the shifting of the push and pull frame of Figure 1 through the movement of the tractor for coupling and uncoupling operation, the carrier is moved forward to the dotted line position of Figure 3 and the cable element 23 will travel forwardly around the pulley or roller 21 and the cable element 24 will travel rearwardly over the pulley or roller 22, the action of the cable elements causing the slide 13' to move forwardly on the carrier 5 and shift the supporting wheels to their lowered dotted line position of Figure 2.

It may be said that by this construction, I avail myself of a shifting of the carrier frame without manual intervention and at the same time obtain a raising and lowering movement of the supporting wheels 1 relative to the road level, which, in effect, makes the movement of the wheels 1 incident to coupling operations of the tractor with respect to the trailer.

In some types of fifth wheel construction, an auxiliary lock is provided for the king pin to prevent accidental separation of the coacting tractor and trailer fifth wheel parts that might otherwise arise, say for instance, through the accidental tripping of the release lever for the usual locking dogs by the operator when in transit. This auxiliary lock is usually in the form of a reciprocal pin lying on the axis of the king pin that drops into an aperture in a plate carried by the lower fifth wheel. This pin is selectively and manually operable in conventional designs and must be withdrawn from locked position before separation of the fifth wheels can be obtained through the release of the locking dogs. The utility of this auxiliary lock is well known to those familiar with the art and I propose to operate this pin incident to the movement of the auxiliary frame so that, when the wheeled carrier moves to its trailer supporting position, the pin will be automatically withdrawn and release of the locking dogs is all that remains to effect complete separation. Thus, the operator need only be concerned with operating the release for the locking dogs as he drives the tractor forward to effect separation, the release for the auxiliary lock being automatically taken care of incident to the shifting of the auxiliary frame.

Specifically, I have shown the locking pin by the numeral 30, and it will be seen that the pin is carried on the axis of the king pin and cooperates with an aperture 30a in the plate 31 carried by the lower fifth wheel. The pin is reciprocal in the king pin base to raise and lower it and the assembly for automatically operating the pin consists of a lever 32 pivotally mounted on spaced ears 33 formed as a part of the slider 18. This lever is pivotally connected at 34 at one end to the pin 30 and is provided with a cam surface at the other end adapted to cooperate with a cam element 38 mounted on the front cross member as shown. By this arrangement, the forward shifting of the slider 18 and auxiliary frame brings the camming elements into engagement at the time when the carriage has been shifted to the zone it occupies while supporting the forward end of the tractor and the pin 30 is lifted automatically. Accordingly all that is left for the operator to do to complete the separation is to operate the release for the locking dogs. The lever 32 is biased toward upward movement on the right side of its pivot to urge the pin 30 downwardly toward cooperation with the plate 31 by an expansion spring 36 carried in the block 18 so that the pin will seat without manual intervention as the tractor and trailer are coupled.

It is to be understood that where this arrangement is employed with the assembly of Figure 1, the operator must, before uncoupling crank the wheels into engagement with the ground so that the wheels will be in proper position to take the load as the auxiliary frame is shifted and the trailer is uncoupled. On the other hand, where the arrangement is employed with the assembly of Figure 3, the wheels automatically move to trailer supporting position as the block 18 moves forwardly and are in position to take the load when the pin 30 is lifted and the vehicle uncoupled. It may be said then that through the medium of the construction just described, I obtain a shifting of the wheel carrier incident to an uncoupling movement of the tractor with respect to the trailer, a lowering of the wheels to the ground engaging position, and a release of the king pin, all of which may be accomplished without manual intervention.

It will be apparent from the drawings, and the description just given, that I may obtain an automatic coupling of the tractor to the trailer, a rearward shifting of the wheel carrier frame and a raising of the wheels 1.

Although I have shown and described certain preferred embodiments of my invention, it will be apparent to those familiar with the art, that certain changes and deviations can be made therefrom, without departing from the spirit and scope of this invention, and I do not care to be limited to the exact disclosure or description given, except as indicated in the appended claims.

Having thus described my invention, what I claim as new and desire to secure by Letters Patent of the United States, is:—

1. In a trailer, a pair of supporting wheels, a support therefor mounted on said trailer and shiftable relative thereto and including members connected to said wheels for moving said wheels independently of the shifting movement of the support, a coupling instrumentality on said trailer shiftable with relation thereto, means connecting said support and said coupling instrumentality whereby, when said coupling instrumentality is shifted said support and wheels are shifted simultaneously.

2. In a trailer vehicle, the combination of a trailer frame having a king pin therein slidable relative to the frame, a wheel carriage including a support and wheel carrying members, all shiftable relative to the frame, said wheel carrying members being pivotally associated with the support to swing about a fixed point on said support, means connecting said wheel support and said king pin whereby movement of the king pin effects shifting of the support, and means associated with the wheel support and frame of the vehicle for raising the wheel carrying members incident to movement of the king pin, said means including a slider associated with the wheel supporting members, a guide for said slider on said wheel carriage and horizontally disposed thereon, a rigid push-pull member pivotally connecting said slider and said wheel-carrying members, and a plurality of flexible cables attached at one end to the trailer and at the other end to said slider.

3. In a trailer vehicle, having supporting wheels, the combination a trailer frame having a king pin therein slidable relative to the frame, a wheel support movable on the frame and including a pivoted part mounting the supporting wheels, means connecting said king pin and support whereby movement of the king pin effects movement of the wheel support, and means associated with the said pivoted part for moving the part and the wheels about the pivot to raise and lower said wheels with relation to the ground, said means including a feed screw, a slider on said screw and associated with the pivoted part, and a crank means for rotating the screw to move the slider.

4. In a trailer vehicle, having wheels, and a frame, a coupling instrumentality shiftable along the vehicle frame, a wheel carriage shiftable along the frame, means connecting the coupling instrumentality and wheel carriage for simultaneous movement, said wheel carriage including a part for mounting said wheels pivotally associated with the wheel carriage, means operable in response to movement of the king pin for moving said part about its pivot, and means for preventing shifting of the king pin from at least two positions of adjustment, said last named means being common to both of said king pin positions.

5. In a trailer vehicle, having wheels and a frame, a coupling instrumentality shiftable along the vehicle frame, a wheel carriage shiftable along the frame, means connecting the coupling instrumentality and wheel carriage for simultaneous movement, said wheel carriage including a part for mounting said wheels pivotally associated with the wheel carriage, means operable for moving said part about its pivot in response to movement of the king pin, and means for preventing shifting of the king pin from at least two positions of adjustment, said means comprising a slider, movable into and out of the path of travel of the king pin in advance of and in rear of the king pin when in such respective positions of adjustment.

6. In a trailer construction, a main frame having road wheels at one end thereof, a shiftable support for the opposite end thereof, said support including ground engaging members movable relative to the support, a king pin on said trailer, a mounting for said king pin slidable with respect to said trailer, instrumentalities for connecting said mounting to said support for simultaneous movement, and means cooperating with the said mounting and movable in a direction normal to the path of travel of the mounting and into a position in advance of and in rear of said mounting for completely and selectively blocking the path of travel of the mounting for preventing movement of the mounting.

7. In a trailer construction, a main frame having road wheels therein, an auxiliary support shiftable with respect to the frame and including a pair of ground engaging members movable relative to the support, a king pin in the trailer, a mounting for said king pin, instrumentalities connecting said king pin and auxiliary support for articulated movement, said mounting comprising a slider block, guide-ways for supporting said block and wherein said block is movable, and means for preventing movement of said block, said means comprising a second slide block mounted for movement in a direction normal to that of the first block and into a position ahead of the first slide block when the king pin is in its rearmost position of adjustment.

8. In a trailer vehicle, the combination of a trailer frame, a shiftable wheel support therein, a member attached to said support and mounting a wheel, said member being movable to raise and lower said wheel, a shiftable king pin having a shiftable locking pin therethrough, said locking pin serving when projected from said king pin to maintain connection between said king pin and a cooperating coupling on another vehicle until said shiftable support has reached a predetermined position, means connecting said king pin with said support for effecting shifting movement of said support responsive to shifting movement of said king pin, and means for shifting said locking pin incident to shifting movement of said king pin, said last mentioned means including a lever pivotally mounted adjacent said king pin and having shifting movement bodily with said king pin, one end of said lever being pivotally connected to said locking pin and the other end of said lever having a cam face, means normally rocking said lever in one direction to project said locking pin from said king pin, and a fixed cam on said trailer disposed in the path of movement of said lever and coacting with the cam face thereof to rock said lever in the opposite direction and withdraw said locking pin within said king pin.

9. In a trailer, a pair of supporting wheels, a support for said wheels, said support being bodily shiftable along said trailer, means operable incident to the coupling of said trailer to a tractor vehicle to shift said support, and means for moving said wheels in a direction normal to the direction of shift independently of movement of said support.

10. In a trailer vehicle having a main frame permanently supported at one end by a suitable wheeled mounting, a king pin adjacent the opposite end of said frame and slidably mounted therein, a wheel support movable on said frame and including a pivoted part mounting temporary supporting wheels, means connecting said king pin and said support and serving to impart movement to said support incident to movement of said king pin, and means for swinging said pivoted part to raise and lower the temporary supporting means relatively to the ground, said last mentioned means including a slider guidingly mounted on said frame for relative movement therealong, a rigid push-pull member pivotally connecting said slider and said pivoted part, and means for actuating said slider along said frame.

EDWIN HOWE ALLEN.